Aug. 28, 1962     F. NEGRI     3,050,851
ROTARY TYPE DRY SHAVER HAVING A CYLINDRICAL GRILL
Filed Oct. 6, 1959
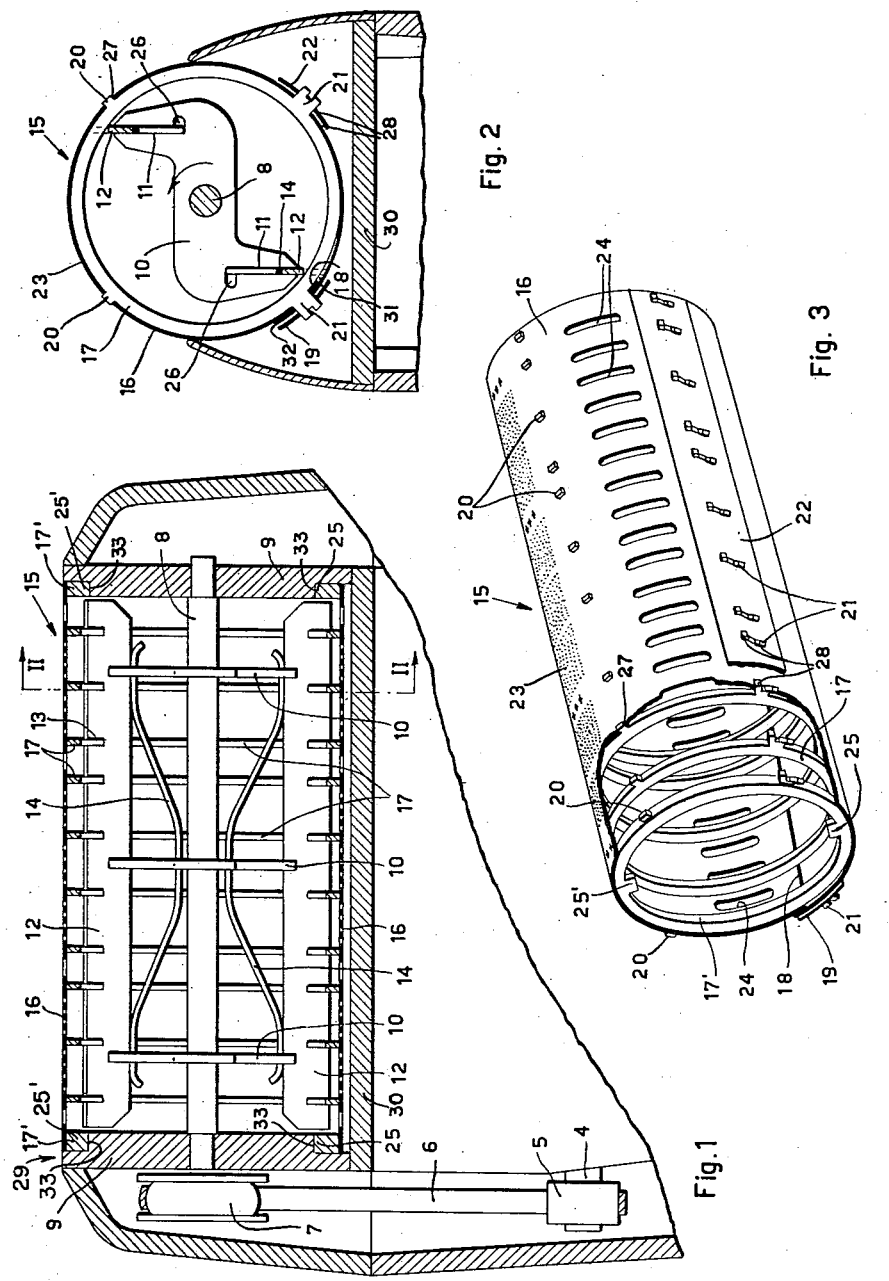
INVENTOR
FRANCO NEGRI
BY
*Kenyon & Kenyon*
ATTORNEYS

United States Patent Office

3,050,851
Patented Aug. 28, 1962

3,050,851
ROTARY TYPE DRY SHAVER HAVING A CYLINDRICAL GRILL
Franco Negri, Ivrea, Italy, assignor to Ing. C. Olivetti & C., S.p.A., Ivrea, Italy, a corporation of Italy
Filed Oct. 6, 1959, Ser. No. 844,685
Claims priority, application Italy Oct. 11, 1958
2 Claims. (Cl. 30—43)

This invention relates to rotary type dry shavers having a cylindrical grill and a spring-loaded blade contacting said grill, said blade being continuously rotated coaxially with said grill. More particularly, the invention relates to the shavers having a substantially semicylindrical shaving surface.

Known dry shavers are provided with a grill formed of a very thin metallic plate supported by a semicylindrical frame comprising a set of ribs connected to a pair of rails parallel to the axis of the grill. These shavers are normally provided with oscillatory cutting blades resulting thus very noisy.

Other known dry shavers having rotary blades are provided with a grill formed of a cylindrical metallic plate supported at the two ends thereof. To support the pressure of the skin during the shaving these grills cannot be very thin, whereby the shaving cannot be satisfactory.

The primary object of the present invention is to provide a rotary type dry shaver having a very thin grill.

Another object of the invention is to provide a shaver having a grill adapted to support the pressure of the skin.

According to the invention, I now provide a dry shaver comprising a casing, a shaft mounted for rotation in said casing, a cylindrical grill secured to said casing coaxially with said shaft, a spring-loaded blade carried by said shaft to contact said grill, and a set of circular members within said grill to rigidly support same.

Further objects, features and advantages of the invention will become apparent from the following detailed description of a preferred embodiment thereof, taken in conjunction with the accompanying drawing, wherein:

FIG. 1 is a partial longitudinal sectional view of a dry shaver according to the invention;
FIG. 2 is a sectional view taken on line II—II of FIG. 1;
FIG. 3 is a partial perspective view of the grill.

With reference to the drawing the shaver comprises a casing 29 (FIG. 1) formed of a pair of stationary plates 9 and a transverse plate 30, and a shaft 8 mounted for rotation on said plates. Secured to the shaft 8 is a pulley 7 which through a belt 6 is driven for continuous rotation by a pulley 5 secured to the shaft 4 of a suitable electric motor, not shown in the drawing. The grooved rim of the pulley 7 is slightly convexed in order to automatically center the belt 6 thereon.

Secured to said casing coaxially with the shaft 8 is a cylindrical grill assembly, generically indicated by the numeral 15. The grill assembly comprises a set of separate annular members or rings 17, 17' and a very thin metallic grill plate 16 (FIGS. 2 and 3) fully wound about said rings, the end portions 31 and 32 of said grill plate being overlapped to form a joint 18. The edges of said portions 31 and 32 are slightly inclined, whereby the joint 18 will be helical. A pair of longitudinal reinforcing strips 19 and 22 distanced substantially 90 degrees is mounted outside the grill plate 16, the strip 19 covering the joint 18. The grill plate 16 is provided with usual shaving holes 23 located on an angular portion thereof, forming the shaving surface, and with two rows of clean out apertures 24 adjacent said shaving surface.

The grill plate 16 is rigidly supported by the rings 17, 17' to ensure proper operation when the shaver is firmly applied against the skin. To this end each ring 17, 17' is provided with a pair of projections 20 symmetrically located with respect to the shaving surface and distanced 90 degrees. The projections 20 enter corresponding holes 27 of the grill plate 16 to enable the rings 17, 17' to be connected thereto at a predetermined angular position. Furthermore, means are provided on each ring 17, 17' for riveting the strips 19, 22 and the grill plate 16 to said rings, said means being formed of a pair of bisected projections 21 entering corresponding holes 28 of the grill plate 16 and of the strips 19, 22, and riveted upon said strips to form a rigid grill assembly.

Means are provided for securing the grill assembly 15 to the casing 29 coaxially with the shaft 8, said means being formed of a pair of projections 25, 25' on each of the two terminal rings 17' having a thickness greater than the other rings 17; the projections 25 are firmly housed in corresponding notches 33 of the plates 9.

It will be apparent that the above described grill assembly may be made with a very thin metallic grill plate and that the rings form a very rigid support of the grill, which is simple and inexpensive to manufacture.

Blades 12 are carried by the shaft 8 to contact the grill plate 16. More particularly, secured to the shaft 8 are three arms 10 (FIGS. 1 and 2) each one formed with a pair of diametrically opposed notches 11 housing a pair of blades 12 provided with a set of notches 13 (FIG. 1) corresponding to the rings 17 of the grill assembly 15. A pair of leaf springs 14 located within the notches 11 urge the blades 12 radially to contact the inner surface of the grill plate 16.

During the operation of the shaver the shaft 8 continuously rotates the two blades 12 counterclockwise (FIG. 2). The blades 12 which are urged radially both by spring action and by centrifugal force are thus guided by the continuous contact with the inner surface of the grill plate 16 through a substantially circular path. Since the joint 18 is helical and the grill plate 16 is very thin, the radial outward movement allowed to the blades 12 upon leaving the joint 18 during their counterclockwise rotation is gradual and substantially irrelevant. The cutting edges of the blades 12 cooperate with the holes 23 to shave the hairs, which may be cleaned out through the apertures 24.

Each notch 11 is formed at its bottom with a lateral enlarged portion 26 (FIG. 2) adapted to latch said springs 14 in an ineffective position, the apertures 24 enabling a suitable pin to be introduced to engage the springs 14. More particularly, to axially mount the shaft 8 and the blades 12 into the grill assembly 15, each spring 14 is first latched into the enlarged portion 26. Thereupon the shaft 8 is mounted on the plates 9 and the notches 13 of each blade 12 are placed in correspondence of the rings 17. The springs 14 are now moved out of the portions 26 by means of said pin introduced through the apertures 24. To axially remove the shaft 8 from the grill assemby, first each spring 14 is depressed by means of said pin introduced through the apertures 24 and latched into the enlarged portion 26. Thereupon the blades 12 are moved out of the rings 17 and the shaft 8 is removed from the plates 9.

It should be understood that the structure disclosed is only illustrative and the invention can be carried out by other means. Also, while it is designed to use the various features and elements in the combinations and relations described, some of these may be altered and modified without interfering with the more general results outlined.

What I claim is:
1. In a dry shaver comprising a casing, a shaft mounted for continuous rotation in said casing, radially urged blades carried by said shaft, a cylindrical grill assembly comprising a set of substantially closely spaced separate annular members and a grill plate made of a flat plate fully wound about said members and rigidly supported thereby, the end portions of said grill plate being overlapped to form a substantially helical joint, a pair of longitudinal reinforcing strips mounted outside said grill plate, one of said strips covering said joint, means on said members for riveting said strips and said grill plate to said members, and a pair of projections on each of two members of said set for securing said grill assembly to said casing with said shaft.

2. In a dry shaver, a casing, a shaft mounted for continuous rotation in said casing, a cylindrical grill assembly secured to said casing coaxially with said shaft, said grill assembly being formed of a set of substantially closely spaced annular members and of a grill plate made of a flat plate fully wound about said members and rigidly supported thereby, a plurality of arms secured to said shaft in mutual axial alignment, a notch on each one of said arms, a blade housed in said notches, and a normally effected leaf spring urging said blade out of said notches to continuously contact said grill during rotation of said shaft, said notches being each formed with an enlarged portion on the bottom thereof for enabling said leaf spring to be latched in an ineffective position, whereby said shaft may be axially displaced with respect to said grill assembly.

References Cited in the file of this patent

UNITED STATES PATENTS

| | | |
|---|---|---|
| 2,234,891 | Bruecker | Mar. 11, 1941 |
| 2,234,893 | Bruecker | Mar. 11, 1941 |
| 2,286,443 | Scully | June 16, 1942 |
| 2,321,932 | Nyhagen | June 15, 1943 |
| 2,688,184 | Jepson | Sept. 7, 1954 |
| 2,803,874 | Obolensky | Aug. 27, 1957 |
| 2,828,539 | Winther | Apr. 1, 1958 |
| 2,890,523 | Bulova et al. | June 16, 1959 |
| 2,982,020 | Bulova et al. | May 2, 1961 |

FOREIGN PATENTS

| | | |
|---|---|---|
| 1,050,751 | France | Sept. 9, 1953 |